G. B. HISTED.
PHOTOGRAPHIC CAMERA.
APPLICATION FILED OCT. 27, 1916.

1,285,176.

Patented Nov. 19, 1918.
3 SHEETS—SHEET 1.

Inventor:
George B. Histed
by Davis & Simms
his attorneys

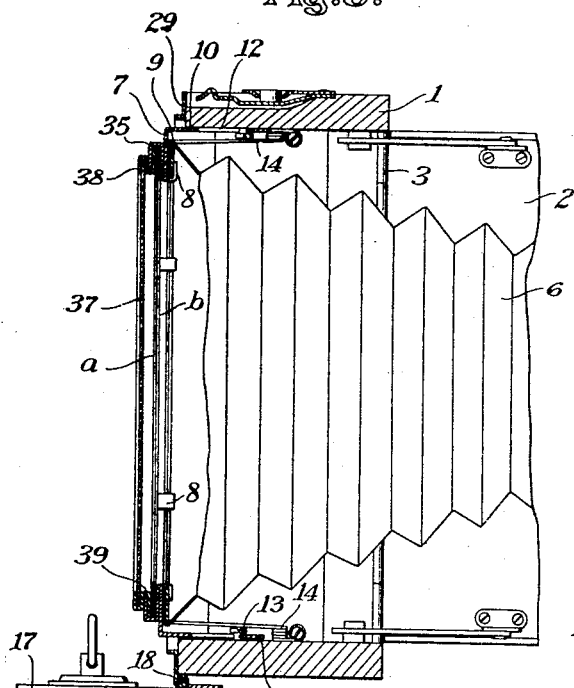
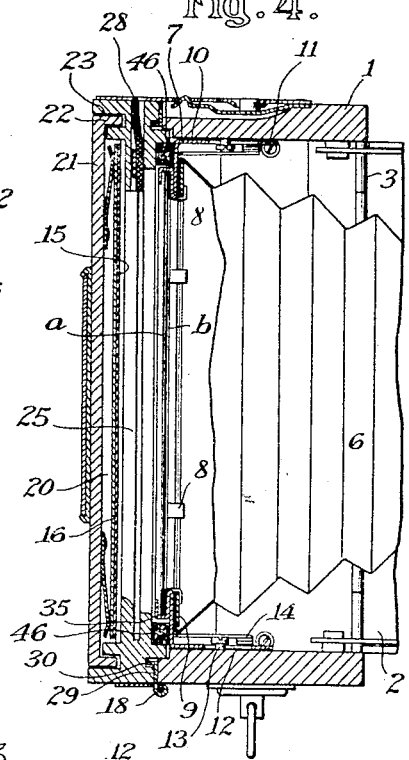
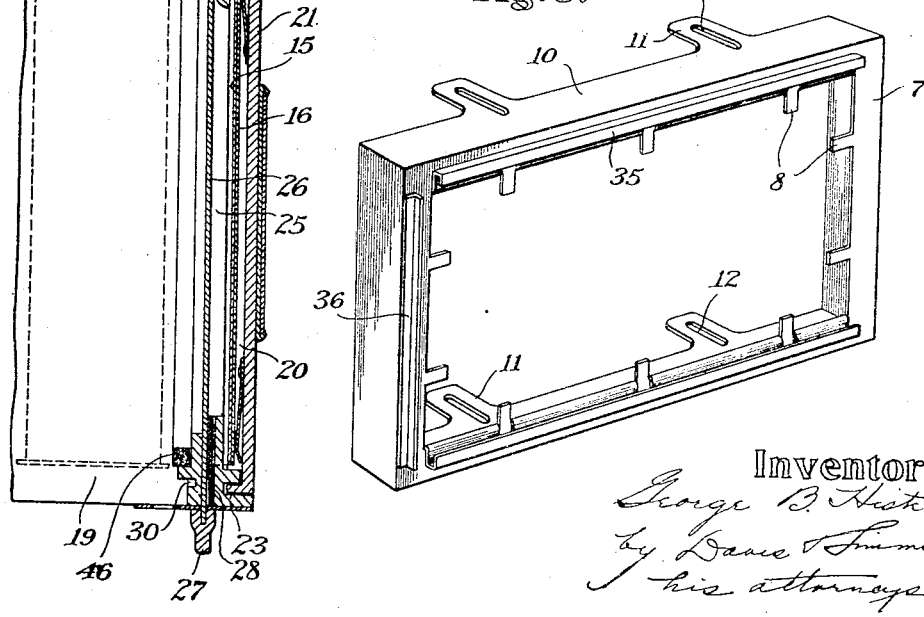

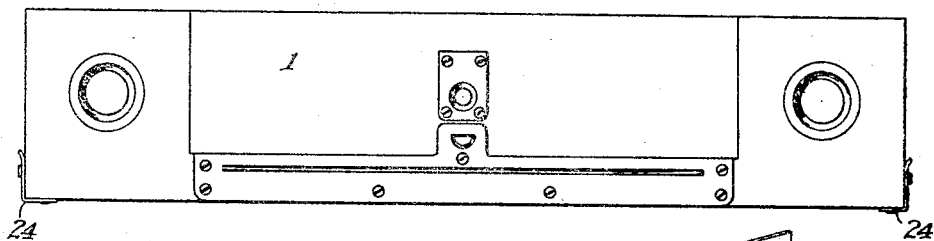
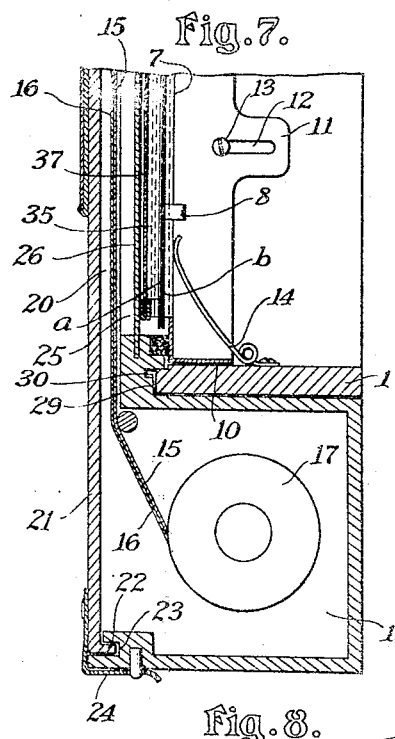
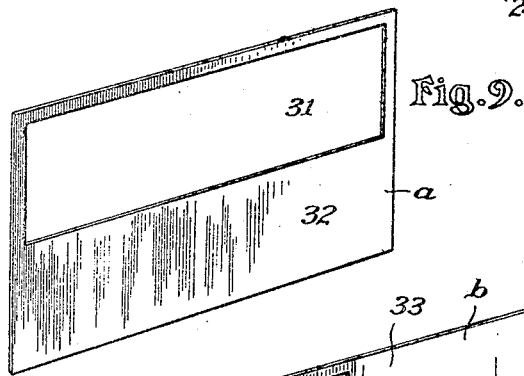
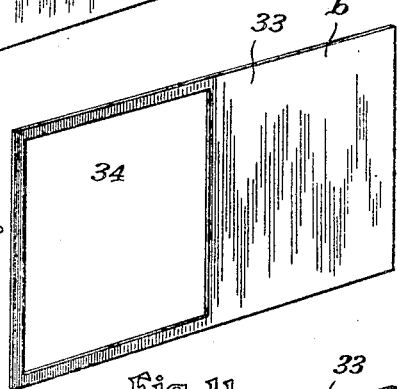
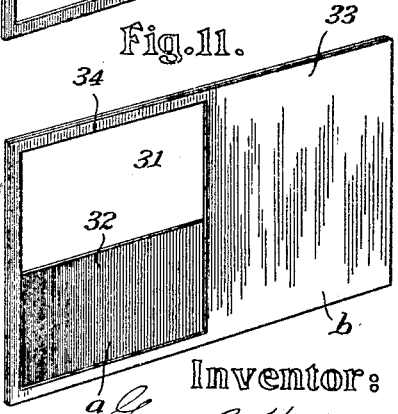

UNITED STATES PATENT OFFICE.

GEORGE B. HISTED, OF ROCHESTER, NEW YORK.

PHOTOGRAPHIC CAMERA.

1,285,176.     Specification of Letters Patent.     Patented Nov. 19, 1918.

Application filed October 27, 1916. Serial No. 128,030.

*To all whom it may concern:*

Be it known that I, GEORGE B. HISTED, a citizen of the United States, and resident of Rochester, in the county of Monroe and State of New York, have invented certain new and useful Improvements in Photographic Cameras, of which the following is a specification.

The present invention relates to photographic cameras and an object thereof is to provide a simple and inexpensive construction which will permit the taking of a various number of exposures of different shapes and sizes upon a sheet of sensitized material which is usually employed for taking but one exposure, thus permitting the users of cameras to economize in taking pictures by doing away with the waste in sensitized material present when a small object is exposed upon a relatively large sheet of sensitized material.

Another object of the invention is to permit the use in film cameras of a focusing screen the support from which is arranged between the exposure aperture and the sensitized material and is so mounted that the sensitized material and the exposure screen may lie at the same distance from the exposure aperture so that the definition of the image on the image screen is the same as that exposed upon the sensitized material.

Still another object of the invention is to provide a common supporting means for a focusing screen and a masking means permitting either one to be removed or fitted to the camera independently of the other.

To these and other ends, the invention consists of certain parts and combinations of parts all of which will be hereinafter described, the novel features being pointed out in the appended claims.

In the drawings:—

Fig. 3 is a view similar to Fig. 2, in which the holder for the sensitized material is swung to open position;

Fig. 4 is a view similar to Fig. 2 in which the focusing screen and the slide are removed, the parts being ready for effecting an exposure;

Fig. 5 is a perspective view of the support for the masking means and the focusing screen;

Fig. 6 is a side view of the camera folded;

Fig. 7 is an enlarged vertical sectional view through the lower portion of the camera;

Fig. 8 is a perspective view of the focusing screen;

Figs. 9 and 10 are perspective views of the two masking members; and

Fig. 11 shows the masking members assembled and in perspective.

Figure 1:
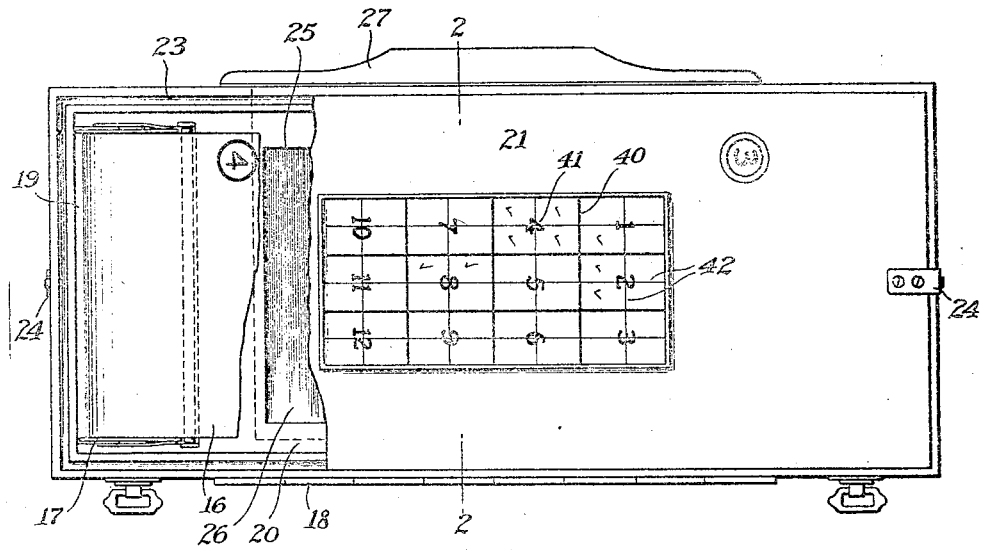
Figure 1 is a rear view of a camera embodying the present improvements, a portion of the back wall being broken away.
Figure 2:
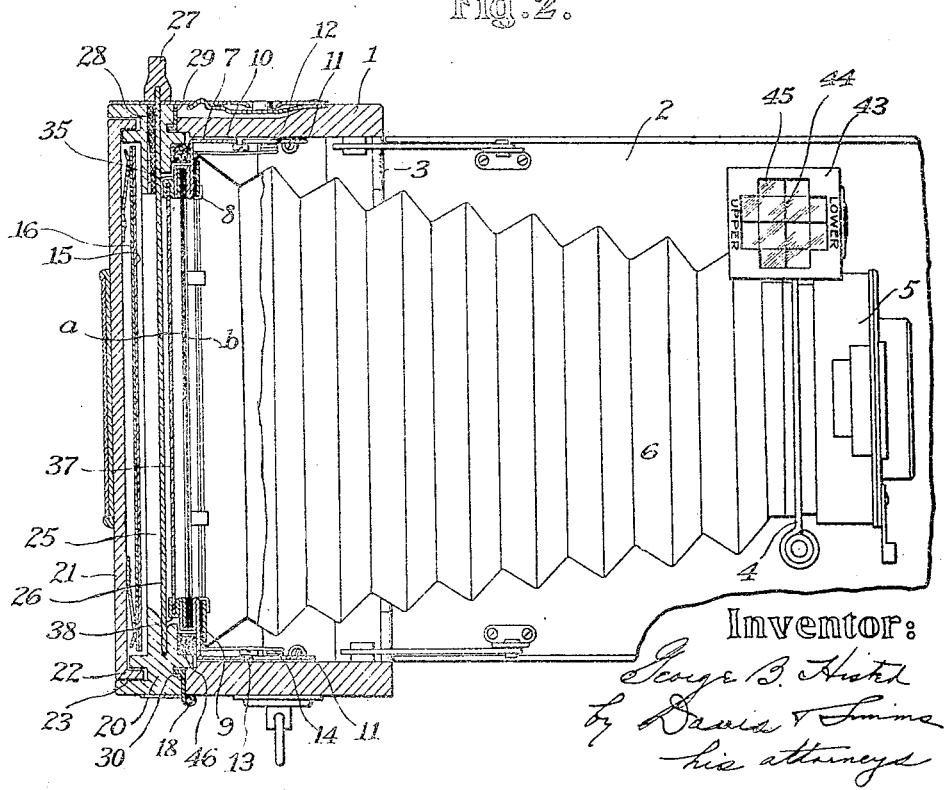
Fig. 2 is a plan view of the same camera with the rear part thereof in horizontal section on the line 2—2, Fig. 1, the slide being shown as interposed between the sensitized material and the exposure aperture and the focusing screen in position.

Referring more particularly to the drawings, 1 indicates a camera casing which, in this instance, is provided with a front 2 hinged at 3 to the casing and adapted to swing downwardly to support the front board 4 of the camera, the latter carrying a shutter 5 of any suitable construction provided with an exposure aperture the front board also serving to support the forward end of the bellows 6. The inner end of the bellows preferably abuts a rectangular frame 7 which, in this instance, is made from sheet metal and preferably has lugs 8 at its inner edge bent forwardly and outwardly over a plate 9 which clamps the bellows against the frame 7.

The frame 7, in addition to serving for securing the bellows within the camera casing, also acts as a support for the focusing screen and the masking means as will be hereinafter more particularly pointed out. To the end that the frame may move toward and from the exposure aperture, this frame 7 has a surrounding flange 10 formed with projections 11 on opposite sides, said projections having slots 12 extending in the direction of the optical axis of the camera. These slots act as guides and to this end receive headed studs 13 secured to the inner wall of the camera casing 1. Springs 14 act on the rectangular frame to move the latter to the limit of its movement away from the exposure aperture, the ends of the slots 12 coöperating with the headed studs 13 to determine such limit of movement.

The sensitized material is preferably in the form of a film 15 having a backing sheet 16 and mounted upon two spools 17. These spools are carried by a holder for the sensitized material which is hinged at 18 to the casing 1. This holder embodies two spool chambers 19 adapted to lie above and below the casing 1 and connected together by a portion 20 which forms a passageway for the travel of the film from one spool to the other. Access to this passageway as well as to the film chambers may be obtained by removing the back 21, the edges of which are turned inwardly at 22 to lie in a surrounding groove 23 on the holder for the sensitized material, thereby preventing the passage of light at this point. Latches 24 secure the back in position. The front wall of the holder for the sensitized material has an exposure opening 25 which is adapted to be closed by a slide 26, said slide having a portion 27 by which it may be shifted to open and close the exposure opening 25. Light excluding means 28 prevents the entrance of light into the camera when the slide is withdrawn. The connecting portion of the holder for the sensitized material enters into light excluding engagement with the rear wall of the casing and to this end said wall is provided with a surrounding flange 29 entering the surrounding groove 30 in the holder for the sensitized material.

The masking means embodies two masking members $a$ and $b$, both of these being preferably elongated sheets. The masking member $a$ has an elongated opening 31 extending substantially throughout the length of the member $a$ and also has a masking portion 32 lying to one side of the elongated opening 31 and extending throughout the length of the member, the width of said masking portion being less than the width of the member. The masking member $b$ has a masking portion 33 which is less than the length of the masking member but which is as wide as the masking member, the masking member $b$ also having an opening 34 to one side of the masking portion 33 but substantially as wide as the masking member although not so long as said member. These masking members may be used individually or collectively, the masking member $a$ when used individually producing an exposed portion on the film or sensitized material which is not so wide as the film or sensitized material, but which is as long as the exposed portion would be if the masking member were not used. The masking member $b$ will produce an exposed portion which is as wide as a film but which is not so long as the exposed portion would be if the masking member were not used. In other words, the masking member $a$ divides the normal exposed portion into two parts longitudinally of the film whereas the masking member $b$ divides the normal exposed portion in two parts transversely of the film. When the two masks are used together, as shown in Fig. 11, the exposed portion of the film is but one quarter of the normal exposed portion of the film, and these two masking members may be so adjusted that this quarter exposed portion may occur at any one of the four corners of the normal exposed portion of the film.

Preferably these masking members are supported upon the frame 7 and to this end said frame is formed with guideways 35 which may be provided by bending the end of the frame 7 outwardly upon itself, then rearwardly and finally inwardly on opposite sides of the frame. A stop 36 at the bottom of the frame serves as a rest for the lower edges of the mask.

The frame 7 also acts as a support for the focusing screen which preferably is in the form of a sheet of celluloid 37 roughened to produce a frosted effect and surrounded by a metallic frame 38. This frame is provided with guide grooves 39 on opposite sides to receive the inwardly-turned portions of the guideway 35. By this mounting of the focusing screen, the latter is held in a fixed position with reference to the frame 7 and the masking members may be removed without affecting the position of the focusing screen or vice versa.

The mounting of the focusing screen on the movable frame 7 permits the focusing screen to be projected from the camera casing 1 under the action of the springs 14, when the holder for the sensitized material is swung on its hinge 18 so that the screen will lie substantially in the plane which the sensitized material will occupy upon exposure. When the holder for the sensitized material is swung to closed position, such holder engages the frame 7 and moves the latter into the casing 1 toward the exposure aperture, so that the frame 7 will not interfere with the closing movement.

On the back wall 21 of the holder for the sensitized material, there is arranged a writing surface formed preferably by a sheet of celluloid or other material on which the matter may be easily erased, and this surface is divided by heavy lines 40 into twelve main spaces or divisions, each of which is appropriately numbered at 41 to correspond with the twelve films in the roll. Each of these main divisions is further divided by light lines 42 into four spaces to correspond with the four different exposures which may be made upon a single film. This writing surface serves as a record for the twelve different films and for all four portions of each film. The film rollers are so mounted that the film may be shifted in either direction so that it is possible to expose a portion of one film, shift such film away from exposing position to present another film on which it is desired to expose a different size or shaped picture, and then bring the first mentioned film back for the exposure thereon of another picture, the record sheet being employed to determine the exposures made.

While it is more desirable to use the focusing screen, the camera may be used in such a manner as to locate the object on the film by means of a finder 43, which is marked to indicate the upper and lower portions of the sensitized material, and has crossed lines 44 on the image glass 45 to divide said glass into four parts to correspond with the four divisions of the masking means.

In a camera constructed in accordance with this invention, it is possible to reduce the expense of taking pictures, because small objects may be taken on small portions of the film or sensitized material so that four pictures may be obtained on one film. Furthermore, better pictures are possible as the camera can be adjusted accurately to the proper focus by means of the focusing screen. The support for this screen is so mounted that the screen can lie in the same plane as the film and, in this way, the user can be assured that the image on the film will have the same definition as that on the focusing screen. The camera is inexpensive to manufacture and the operation thereof is simple.

What I claim as my invention and desire to secure by Letters Patent is:—

1. In a camera, the combination with a camera casing and a holder for sensitized material movable on the casing to open and close the casing, of a movably mounted support arranged on the casing between the exposure aperture and the holder, said support having means thereon for supporting simultaneously a focusing screen and a masking means for simultaneous use.

2. In a camera, the combination with a camera casing and a holder for the sensitized material movable to open and close the casing, of a support on the casing movable in the direction of the axis of the camera when the holder is closed on the casing, and a focusing screen slidably mounted on such support in order to be readily withdrawn from the support.

3. In a camera, the combination with a camera casing and a holder for sensitized material mounted for movement on the casing, of a frame mounted on the casing and movable in the direction of the axis of the camera, a bellows foldable within the casing and connected to the frame, and a focusing screen detachably connected to the frame.

4. In a camera, the combination with a camera casing and a holder for sensitized material mounted to open and close the casing; of a frame mounted within the casing and movable bodily in the direction of the axis of the camera, said frame having means thereon for securing a focusing screen and masking means, and said frame being engaged by the holder when the latter is moved to close the casing so as to move the frame away from focusing position, and spring means acting on said frame to move the latter to focusing position when the holder is moved to open the casing.

5. In a camera, the combination with a camera casing and a holder for sensitized material movable on the casing to open and close the latter, of a masking means supported between the holder and the exposure aperture of the camera, and means for detachably supporting a focusing screen between the masking means and the holder so that the masking means may be employed with the focusing screen as well as with the sensitized material, the supporting means for the focusing screen being moved by the holder toward the exposure aperture and away from focusing position when the holder is moved to close the camera casing.

6. In a camera, the combination with a camera casing and a holder for sensitized material movably mounted on the casing, of guides arranged on the casing, masking means detachably supported on the guides in coöperative relation with the sensitized material and adapted to be removed only when the holder for the sensitized material is moved away from the casing and a focusing screen removably arranged on the guides of the casing in coöperative relation with the masking means.

7. In a camera, a casing, a rectangular frame guided for movement in the direction of the optical axis of the camera and having guides thereon, a focusing screen detachably supported on the guides, and a holder for sensitized material mounted in rear of the rectangular frame and adapted to move said frame forwardly when the holder is swung to carry the sensitized material to the effective or exposure plane.

8. In a camera, a casing, a rectangular frame guided for movement in the direction of the optical axis of the camera and having guides thereon, a focusing screen detachably supported on the guides, a holder for sensitized material mounted in rear of the rectangular frame and adapted to move said frame forwardly when the holder is swung to carry the sensitized material to the effective or exposure plane, and means for projecting the rectangular frame to carry the focusing screen to the effective or exposing plane of the sensitized material.

9. In a camera, a casing, a rectangular frame guided for movement in the direction of the optical axis of the camera, a bellows having its rear end secured to said rectangular frame, a focusing screen detachably supported on the rectangular frame, and a holder for sensitized material, movably mounted on the casing in rear of the focusing screen.

10. In a camera, a casing, a rectangular frame guided for movement in the direction of the optical axis of the camera, a bellows having its rear end secured to said rectangular frame, a focusing screen detachably supported on the rectangular frame, a holder for the sensitized material, movably mounted in rear of the rectangular frame and adapted to move said frame forwardly when the holder is moved to carry the sensitized material to the effective or exposure plane, and means for projecting said rectangular frame rearwardly to carry the focusing screen to the exposure plane when the holder for the sensitized material is moved away from the camera casing.

11. In a camera, guiding means thereon, masking means coöperating with said guiding means, and a focusing screen having guiding means thereon also coöperating with the guiding means of the masking means.

12. In a camera, a casing, grooved guides thereon, masking means operating in the grooves of the guides, and a focusing screen having grooved guiding means in opposite sides receiving one wall of each of the grooved guides for the masking means.

13. In a camera, the combination with a camera casing and a holder for the sensitized material arranged to close the casing, of a frame movable on the casing in the direction of the optical axis of the camera between the exposure aperture of the camera and the sensitized material, a focusing screen removably supported on said frame, and masking means also removably supported by said frame to coöperate with the holder for the sensitized material and with the focusing screen.

GEORGE B. HISTED.

Copies of this patent may be obtained for five cents each, by addressing the "Commissioner of Patents, Washington, D. C."